UNITED STATES PATENT OFFICE 2,595,030

BIS[2- DIETHANOLAMINO - 4 - p -ANISIDINO-1, 3, 5 - TRIAZYL-(6)-]- 4, 4'- DIAMINOSTIL-BENE-2,2'-DISULFONIC ACID

William E. Wallace, Phillipsburg, N. J., assignor to General Aniline & Film Corporation, New York, N. Y., a corporation of Delaware No Drawing. Application September 1, 1948, Serial No. 47,344

1 Claim. (Cl. 260—249.6)

This invention relates to a novel derivative of 1,3,5-triazyl - (6) -4,4' - diaminostilbene sulfonic acid possessing new and useful properties as a fluorescing optical bleaching or whitening agent.

I have discovered that bis[2-diethanolamino-4-anisidino-1,3,5-triazyl-(6)-]-4,4'-diaminostilbene disulfonic acid is a valuable fluorescing agent which fluoresces with a desirable shade and possesses remarkable stability to chlorine and ultraviolet light, being superior in these properties to known bis[1,3,5-triazyl-(6)-] - 4,4' - diaminostilbene-2,2'-disulfonic acids, such as those described in U. S. Patent No. 2,171,427, issued August 29, 1939, to John Eggert and Bruno Wendt, and in particular, being superior to known related compounds in chlorine fastness.

This novel bis[2-diethanolamino-4-anisidino-1,3,5-triazyl-(6)-]-4,4'-diaminostilbene - 2,2'-disulfonic acid, which has the formula:

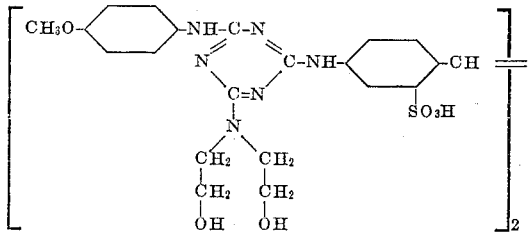

is particularly useful as a fluorescing optical bleaching or whitening agent for application to cellulosic materials, such as cotton, regenerated cellulose, rayon, cellulose acetate and the like. When small amounts of this material, usually in the form of sodium or other alkali metal salts are used in soaps or other detergents, fabrics which are washed with such formulations will be much whiter in the case of whites, and brighter in the case of colors, than fabrics which are washed with ordinary soaps or detergents. This material may also be used in bleaching processes for various fibers and when so used, it has been found that the amount of bleach necessary may be materially reduced. The material may also be incorporated in discharge pastes to effect the production of whites upon discharge which are remarkably whiter than discharges which are made in the absence of such materials. This material may also be incorporated in synthetic fibers and films, especially those of cellulosic origin such as regenerated cellulose, cuprammonium cellulose, cellulose acetate and the like, by adding a small amount thereof to the spinning solutions or precipitating baths in order to effect a noticeable whitening of the finished material.

This novel compound may readily be prepared by syntheses known in the art for preparing related compounds, a preferred procedure being as follows:

37 parts of cyanuric chloride are dissolved in 120 parts of acetone and poured into a mixture of ice and water. During the suspension in ice and water, the temperature of the aqueous suspension should not rise above 5° C. 37 parts of 4,4'-diaminostilbene-2,2'-disulfonic acid dissolved in 150 parts of water with the addition of enough sodium carbonate to give a neutral solution is then slowly added to the cyanuric chloride suspension. At the same time a solution of sodium carbonate is added in order to prevent the mixture from becoming too acid. During this condensation, the temperature is maintained below 5° C. When the condensation is complete, as evidenced by the fact that a sample of the reaction mixture which has been acidified and treated with sodium nitrite does not develop color when treated with an alkaline solution of R salt, a solution of 31.9 parts of p-anisidine hydrochloride is added and immediately afterward a solution of 160 parts of anhydrous sodium acetate and 400 parts of water is added. The mixture is allowed to warm to room temperature and may be heated to 35-40° C., if necessary, to complete the condensation. When this secondary condensation is complete, 25 parts of diethanolamine is added and the pH of the reaction mixture is increased to 7.5-8 with sodium carbonate solution. The mixture is then heated slowly to 90° C. and is maintained at that temperature for three hours. The reaction mixture is then cooled and the product is isolated in the usual manner. The material which is obtained is tan in color and moderately soluble in water, but very slightly soluble in acetone, alcohol, ether, etc.

I claim:

The compound bis[2 - diethanolamino - 4-p-anisidino-1,3,5-triazyl-(6)-] - 4,4' - diaminostilbene-2,2'-disulfonic acid, having the formula:

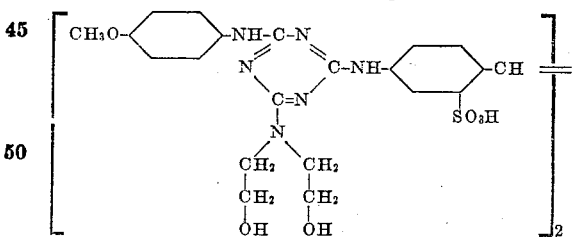

WILLIAM E. WALLACE.

(References on following page)

REFERENCES CITED

The following references are of record in the file of this patent:

UNITED STATES PATENTS

| Number | Name | Date |
|---|---|---|
| 2,171,427 | Eggert | Aug. 29, 1939 |
| 2,376,743 | Wendt | May 22, 1945 |

FOREIGN PATENTS

| Number | Country | Date |
|---|---|---|
| 55,370 | Netherlands | 1943 |

OTHER REFERENCES

Ser. No. 381,856 Wendt (A. P. C.), published May 11, 1943.